(12) United States Patent
Cook

(10) Patent No.: US 8,023,183 B1
(45) Date of Patent: Sep. 20, 2011

(54) ALL-REFLECTIVE WIDE-FIELD-OF-VIEW TELESCOPE WITH BENEFICIAL DISTORTION CORRECTION

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/766,041

(22) Filed: Apr. 23, 2010

(51) Int. Cl.
*G02B 17/06* (2006.01)
(52) U.S. Cl. ......................................... 359/366; 359/859
(58) Field of Classification Search .................. None
See application file for complete search history.

(56) References Cited

U.S. PATENT DOCUMENTS

| | | | |
|---|---|---|---|
| 4,598,981 A | | 7/1986 | Hallam et al. |
| 4,804,258 A | * | 2/1989 | Kebo ............................ 359/366 |
| 5,257,139 A | * | 10/1993 | Higuchi ........................ 359/859 |
| 6,356,388 B1 | * | 3/2002 | Geyl ............................ 359/366 |
| 2008/0266687 A1 | * | 10/2008 | Cook ............................ 359/859 |
| 2009/0212219 A1 | | 8/2009 | Cook |

OTHER PUBLICATIONS

Distortion (optics), http://en.wikipedia.org/wiki/Distortion_(optics) (4 pages) (last modified Apr. 19, 2010).

* cited by examiner

*Primary Examiner* — Arnel C Lavarias
(74) *Attorney, Agent, or Firm* — Pillsbury Winthrop Shaw Pittman LLP

(57) ABSTRACT

A wide-field-of-view (WFOV) optical system includes a negative optical-power primary mirror configured to receive and reflect light from an image scene; a low optical-power secondary mirror configured to receive and reflect light from the primary mirror; a negative optical-power tertiary mirror configured to receive and reflect light from the secondary mirror; and a positive optical-power quaternary mirror configured to receive and reflect light from the tertiary mirror. The primary, secondary, tertiary and quaternary mirrors are configured to maintain an effective focal length (EFL) at edges of the field of view (FOV) of the optical system to be at least equal to a center of the FOV of the optical system so that a spatial resolution of the optical system essentially remains constant across the FOV.

22 Claims, 9 Drawing Sheets

No Distortion

Negative (Barrel) Distortion

Positive (Pincushion) Distortion

| Surface | Function | Radius | CC | Ad | Ae | Af | Ag | Yd | Alpha | Thickness | Material |
|---|---|---|---|---|---|---|---|---|---|---|---|
| 210 | Primary | 84.7057 | n/a | -9.0725E-06 | 8.6374E-09 | -5.4791E-12 | 7.9087E-16 | 0.58679 | 9.1001 | -19.3277 | Refl |
| 220 | Secondary | 412.214 | n/a | -1.0947E-05 | -1.6884E-08 | 1.6819E-11 | 4.5203E-14 | -2.3076 | 14.1429 | 19.3694 | Refl |
| 230 | Tertiary | 50.9908 | n/a | -1.9314E-06 | 2.5725E-08 | -2.3924E-10 | 2.6564E-12 | 4.3082 | 0.7078 | -26.1579 | Refl |
| 240 | Quaternary | 43.3569 | 0.098063 | 1.3932E-07 | -2.9087E-10 | 2.9417E-12 | 1.3685E-14 | 2.5528 | 0.34527 | 26.1581 | Refl |
| 250 | Stop | inf | n/a | n/a | n/a | n/a | n/a | 7.9161 | n/a | 14.0796 | air |
| 260 | Image | inf | n/a | n/a | n/a | n/a | n/a | 9.3937 | n/a | n/a | air |

FOV is 3.0 x 60.0 deg

FOV Offset is -23.566 deg

Entrance Pupil is 3.3 diameter (nominal)

Aperture Stop is 4.722 diameter

Focal Length is 10.78 (nominal)

Speed is F/3.26 (nominal)

Fig. 3

| Surface | Function | Radius | CC | Ad | Ae | Af | Ag | Yd | Alpha | Thickness | Material |
|---|---|---|---|---|---|---|---|---|---|---|---|
| 510 | Image | inf | n/a | n/a | n/a | n/a | n/a | 10.8598 | n/a | 8.2852 | air |
| 520 | Stop | inf | n/a | n/a | n/a | n/a | n/a | 10.0122 | n/a | 13.6180 | air |
| 530 | Quaternary | -25.9967 | n/a | -1.5199E-06 | 1.3247E-09 | -7.1120E-11 | 3.2580E-13 | 6.3862 | -3.2420 | -14.4734 | Refl |
| 540 | Tertiary | -47.6572 | n/a | -1.4796E-05 | 3.0341E-08 | -2.6034E-09 | 2.4175E-11 | 7.8454 | -4.4604 | 24.5008 | Refl |
| 550 | Secondary | 1046.53 | n/a | 1.2372E-05 | 6.1167E-08 | -6.8722E-11 | -2.4418E-13 | 1.3222 | -16.4240 | -26.0570 | Refl |
| 560 | Primary | -28.4585 | n/a | 2.2702E-05 | -6.7212E-09 | -6.1776E-12 | 2.0664E-14 | 6.6738 | -2.7016 | n/a | Refl |

FOV is 1.0 x 120.0 deg

FOV Offset is -16.620 deg

Entrance Pupil is 0.84 diameter (nominal)

Aperture Stop is 2.762 diameter

Focal Length is 2.58 (nominal)

Speed is F/3.07 (nominal)

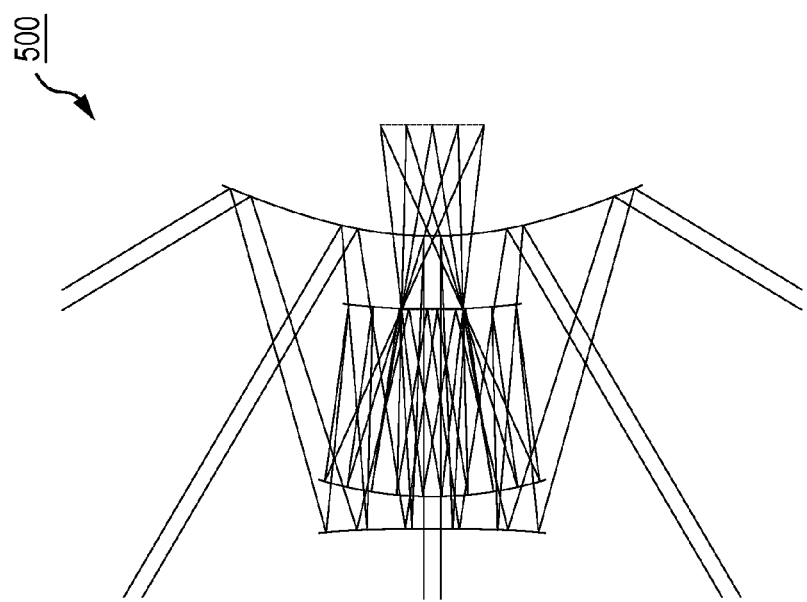
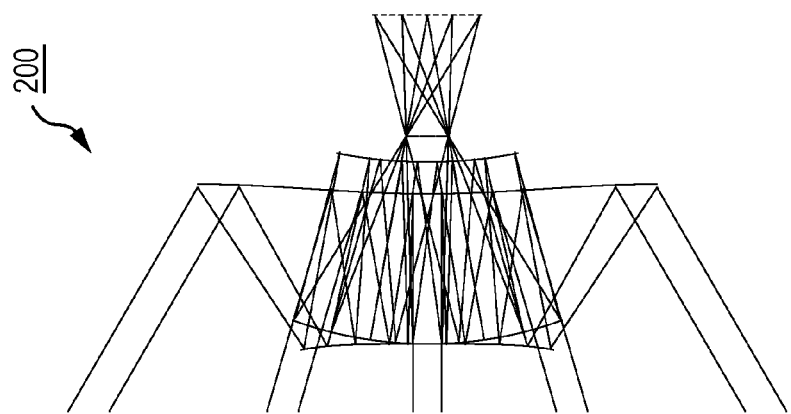
Fig. 8

ALL-REFLECTIVE WIDE-FIELD-OF-VIEW TELESCOPE WITH BENEFICIAL DISTORTION CORRECTION

BACKGROUND

This application generally relates to optical systems, and more particularly to an all-reflective wide-field-of-view telescope with beneficial distortion correction.

Many wide-field-of-view (WFOV) optical systems, whether reflective or refractive, are of the inverse-telephoto family. This generally means that there is considerable negative optical power in the optical elements at the front of the optical system and considerable positive optical power in the optical elements at the rear of the optical system. In contrast to this, the family of telephoto optical forms has considerable positive optical power in front and considerable negative optical power at the rear. Examples of inverse-telephoto optical system are described, for instance, in U.S. Patent Application Publication No. 2008/0266687, herein incorporated by reference in its entirety. These optical systems may be characterized, for example, as having a large negative powered first optical element, or the so-called "fish-eye" configuration.

Typically, these systems have noticeable negative (or barrel) distortion, i.e., where the focal length at the edge of the field of view (FOV) is shorter than at the FOV center. This gives rise to image compression at the FOV edge. When used in an airborne or space-borne sensing application, the shorter focal length at the FOV edge combines with the longer range at the FOV edges to greatly increase the ground sample distance (GSD). This is generally detrimental to the spatial resolution of optical systems at the FOV edges.

SUMMARY

In an embodiment, a wide field of view (WFOV) optical system comprises: a negative optical-power primary mirror configured to receive and reflect light from an image scene; a low optical-power secondary mirror configured to receive and reflect light from the primary mirror; a negative optical-power tertiary mirror configured to receive and reflect light from the secondary mirror; and a positive optical-power quaternary mirror configured to receive and reflect light from the tertiary mirror, wherein the primary, secondary, tertiary and quaternary mirrors are configured to maintain an effective focal length (EFL) at edges of the field of view (FOV) of the optical system to be at least equal to that at the center of the FOV of the optical system so that a spatial resolution of the optical system essentially remains constant across the FOV.

In another embodiment, a method for imaging the ground from an altitude comprises: providing a wide field of view (WFOV) optical system including: a negative optical-power primary mirror configured to receive and reflect light from an image scene and reflect; a low optical-power secondary mirror configured to receive and reflect light from the primary mirror; a negative optical-power tertiary mirror configured to receive and reflect light from the secondary mirror; and a positive optical-power quaternary mirror configured to receive and reflect light from the tertiary mirror; and configuring the primary, secondary, tertiary and quaternary mirrors so as to maintain an effective focal length (EFL) at edges of a field of view (FOV) of the optical system to be at least equal to that at the center of the FOV of the optical system so that a spatial resolution of the optical system essentially remains constant across the FOV.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 3 shows one optical prescription for one exemplary implementation of the WFOV optical system shown in FIG. 2 in accordance with an embodiment.

FIG. 6 shows one optical prescription for one exemplary implementation of the WFOV optical system shown in FIG. 5 in accordance with an embodiment.

FIG. 8 shows both the WFOV optical system shown in FIG. 2 and the WFOV optical system shown in FIG. 5 depicted in a common scale.

DETAILED DESCRIPTION

According to an embodiment, a WFOV reflective optical system is described which increases the FOV, while maintaining an effective focal length (EFL) at edges of the field of view (FOV) of the optical system to be at least equal to that at the center of the FOV of the optical system so as that the spatial resolution of the optical system does not degrade across the FOV (i.e., it essentially remains constant). In some implementations, positive distortion may be introduced wherein the EFL at an edge of the FOV is substantially greater than that at the center for the FOV.

Figure 1A:
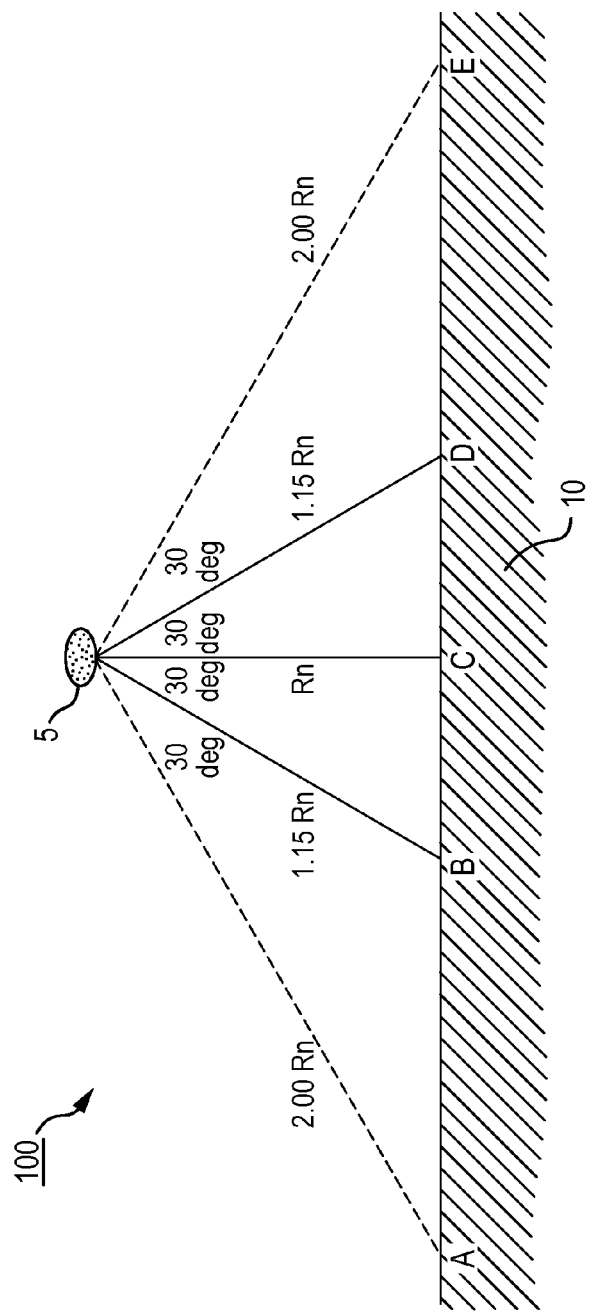
FIG. 1(a) illustrates a scenario depicting the viewing angle of an optical system positioned above the ground and looking downward.

FIG. 1(a) illustrates scenario 100 depicting the viewing angle of a WFOV optical system 5 positioned above the ground and looking downward. As used herein, a "wide field of view (WFOV) optical system" may be characterized as having a total FOV of 60 degrees or greater.

WFOV optical system 5, for instance, may be mounted on a satellite, space station, rocket, airplane, helicopter, balloon, blimp, dirigible, cruise missile, autonomous drone aircraft, or other air- or space-based platforms. It may be configured to image ground 10 and/or ground-based objects. Different points A-E on ground 10 are depicted corresponding to different FOVs of optical system 5.

The distance from optical system 5 to ground 10 at point C along the nadir (i.e., looking straight down to the ground from object 5) is depicted as Rn. At a viewing angle of +/−30 deg. half FOV (or 60 deg. total FOV), the viewing distance from optical system 5 to points B and D on ground 10 is approximately 1.15×Rn. And, at a viewing angle +/−60 deg. half FOV (or 120 deg. total FOV), the viewing distance from optical system 5 to points A and E on ground 10 is 2×Rn.

For simplicity, scenario 100 assumes a "flat-Earth" model. For the flat-Earth model, there is a 2:1 ratio of the viewing distance to nadir Rn at a FOV of 120 degrees. This flat-Earth assumption may be generally accurate for an altitude up to about 60,000 feet. Above that altitude, the flat-Earth model may no longer be suitable. For instance, at low Earth orbit (LEO) at an altitude of about 100-1,240 miles, there is actually about a 3:1 ratio of the viewing distance to nadir Rn at a FOV of 120 degrees due to the curvature of Earth.

Figure 1B:
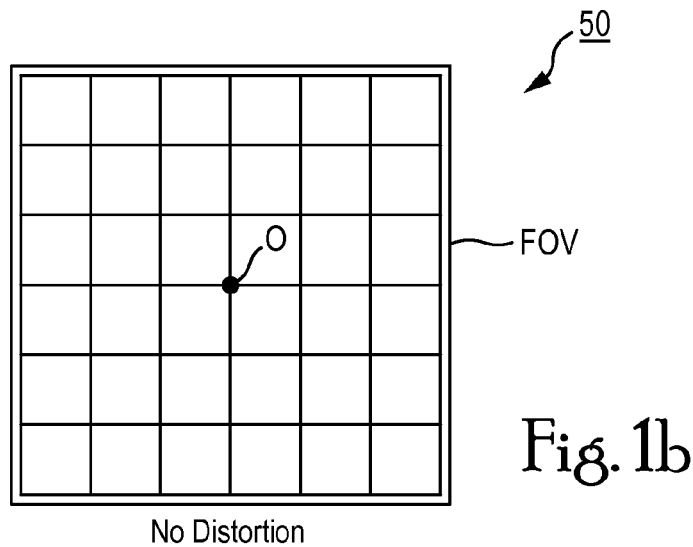
FIGS. 1(b)-1(d) show the effects of different distortions on the FOV.
Figure 1C:
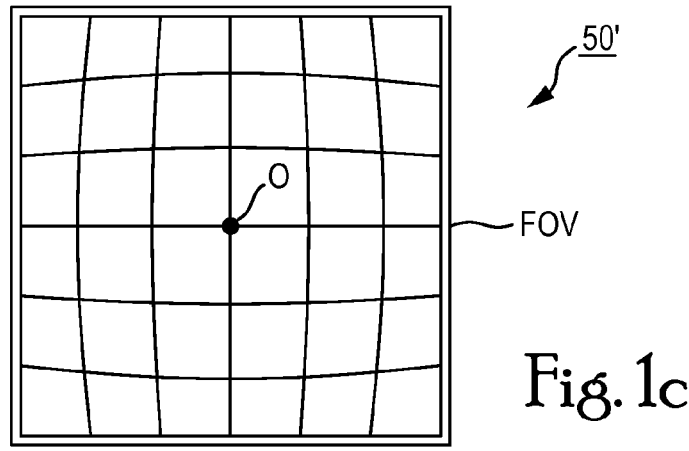
Figure 1D:
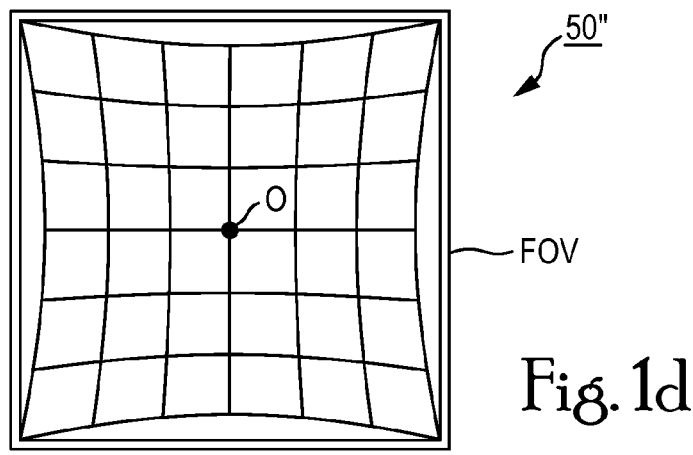

FIGS. 1(b)-1(d) show the effects of different distortions on the FOV. While the FOV is shown as being square in these examples, it will be appreciated that the FOV may be circular or differently-shaped based on the optics of the particular optical system.

FIG. 1(b) shows image 50 of a 6×6 grid in FOV having no distortion. There is no noticeable change in the image shape at center O of the FOV compared to at the boundary edges of FOV.

FIG. 1(c) shows image 50' of the 6×6 grid shown in FIG. 1(b) having negative distortion (i.e., where the EFL decreases with distance from the center of the FOV). This distortion causes a so-called "barrel" effect on the image making it appear to recede radially inwardly from center O of FOV; this is particularly evident at the FOV diagonal. By doing so, some spatial resolution at the boundary edges of FOV has been lost.

On the other hand, FIG. 1(d) shows image 50" of the 6×6 grid shown in FIG. 1(b) having positive distortion (i.e., where the EFL increases with distance from the center of the FOV). As shown, the distortion causes a so-called "pincushion" effect in which the boundary edges of FOV of the image appear protruding outwardly to center O of FOV; this is particularly evident at the FOV diagonal. Unlike the negative distortion depicted in FIG. 1(c), by introducing positive distortion, the spatial resolution at the edges of FOV has not been lost and may actually improve.

Electronic distortion correction algorithms may be used to correct for negative and/or positive distortion as known in the art. These algorithms generally change the shape of the image collected. However, the lost spatial resolution at the edges of the FOV due to negative distortion cannot be regained and/or corrected by electronic distortion correction algorithms alone.

Figure 2A:
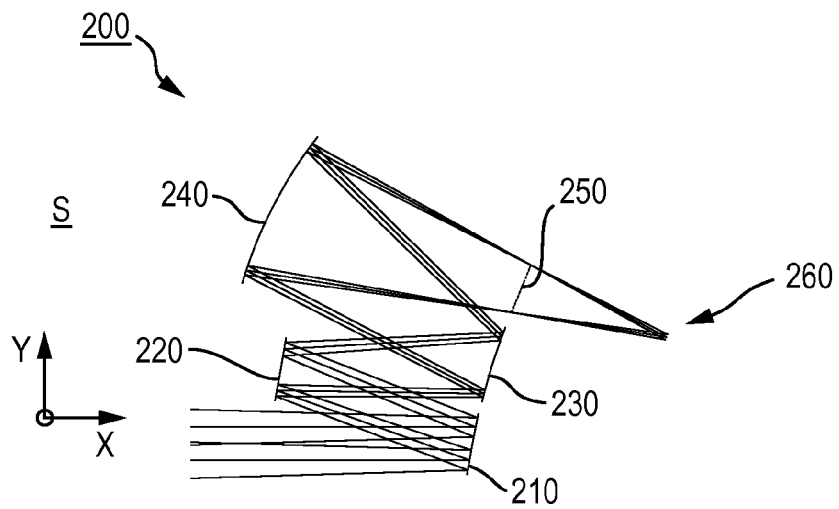
FIGS. 2(a) and (b) depict a ray-trace section of a WFOV optical system in accordance with an embodiment.
Figure 2B:
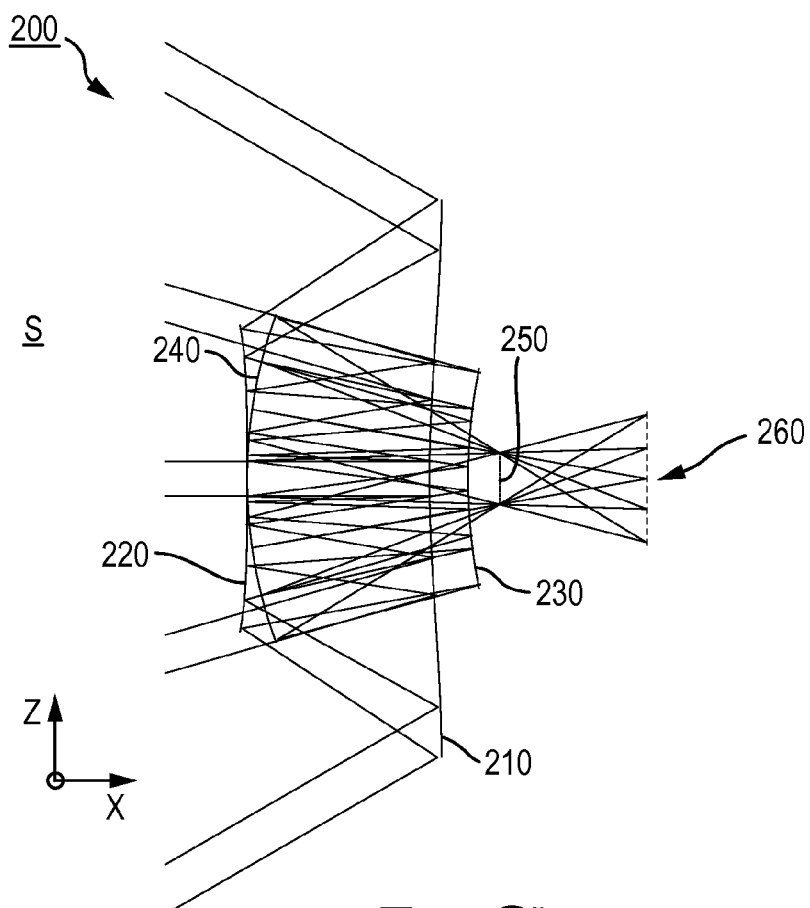

FIGS. 2(a) and (b) depict a ray-trace section of WFOV optical system 200 in accordance with an embodiment. FIG. 2(a) shows a side view and FIG. 2(b) shows a top view of optical system 200.

Optical system 200 may be configured in some implementations as a wide angle large reflective unobscured systems (WALRUS)-type optical systems characterized as having significant negative optical power in the front mirror or mirrors (e.g., the primary, the primary and secondary or even the primary, secondary and tertiary) and significant positive optical power in the rear mirror or mirrors (e.g., the quaternary or possibly the tertiary and quaternary) and an external posterior aperture stop. As shown, optical system 200 may be configured provide a 60 degree line FOV.

Optical system 200 may include four optically powered mirrors. As used herein, an "optically powered mirror" has a positive or negative optical power rather than zero optical power. Mirrors with positive or negative optical power are curved, while mirrors with zero optical power are substantially flat.

As depicted on the beam path illustrated beginning from image scene S, there is negative optical-power primary mirror 210, low optical-power secondary mirror 220, negative optical-power tertiary mirror 230, and positive optical-power quaternary mirror 240 closest (as measured along the beam path) to image plane 260. Light from scene S is incident on primary mirror 210, reflects from the primary mirror 210 to secondary mirror 220, reflects from secondary mirror 220 to tertiary mirror 230, reflects from tertiary mirror 230 to quaternary mirror 240, and reflects from quaternary mirror 240 through aperture stop 250 to image plane 260. As shown, aperture stop 250 may be located essentially midway between the quaternary mirror 240 and image plane 260.

Secondary mirror 220 is low optical-powered in that it has a much longer radius that than the other mirrors. For instance, the radius of secondary mirror 220 may be at least 10 times that of the radii of the other mirrors.

The location of image plane 260 may be used for positioning an imaging device. For example, a reflective double-pass spectrometer for hyperspectral imaging applications may be used, as described, for example, in U.S. Patent Application Publication No. 2008/0266687, mentioned above.

FIG. 3 shows one optical prescription 300 for an exemplary implementation of WFOV optical system 200 in accordance with an embodiment, and which is raytraced forward. Ad, Ae, Af, Ag are aspheric constants, CC is a conic constant, Yd is a decenter in the y direction, and Alpha is a tilt in the y direction meaning a rotational axis that runs parallel to the x axis.

The configuration enables optical system 200 to have a 60 degree FOV, and positive distortion of about +15% or more. The positive sign distortion means that the focal length at the FOV edge is longer than that at the FOV center. Positive distortion (rather than negative distortion) is beneficial in this situation in that no spatial resolution of the image may be lost at the edges of the FOV. Thus, the ground sample distance (GSD) may remain constant.

For airborne and space-borne sensing applications, this positive distortion substantially counteracts the increased range at the edge of a +/−30 deg. FOV, so that the GSD remains nearly constant across the FOV. This means that the decrease in the angular subtense (i.e., physical pixel size/effective focal length) of an imaging pixel on the focal plane array due to the longer focal length exactly compensates for the longer range to the ground that occurs at the edge of the field of view. Thus the ground sample distance is maintained, and the spatial resolution of the optical system does not degrade across the FOV.

The spatial resolution of optical system 200 may advantageously provide benefits for airborne and space-borne sensing systems, alike, including pan and hyperspectal imaging.

Figure 4:
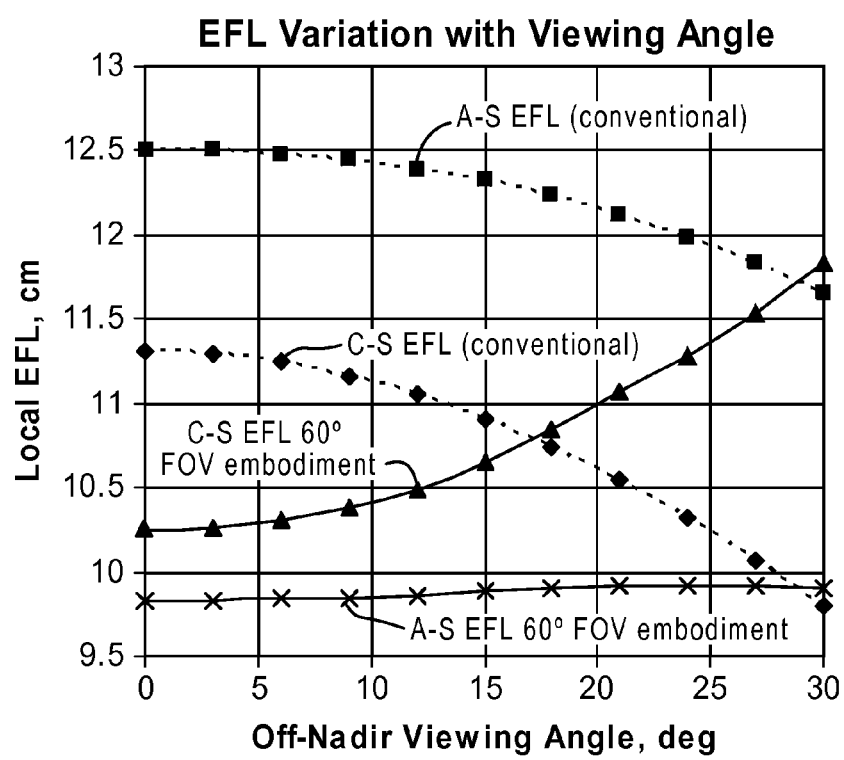
FIG. 4 is a plot of effective focal length (EFL) vs. the off-nadir view angle for a conventional inverse-telephoto optical system and the WFOV optical system shown in FIG. 2.

FIG. 4 is a plot of effective focal length (EFL) vs. the off-nadir view angle for a conventional inverse-telephoto optical system and WFOV optical system 200, respectively. The conventionally-depicted inverse-telephoto optical system might be configured consistent with the disclosure in U.S. Patent Application Publication No. 2008/0266687, mentioned above.

The plots shows distortion in the along-scan (A-S) direction and the cross-scan (C-S) direction. The A-S direction generally corresponds to the view looking toward the ground parallel to the direction in which an optical system may be moving (e.g., in a trajectory, flight path, orbit, etc.). Conversely, the C-S generally direction corresponds to the view looking toward the ground orthogonal to the A-S direction.

As the off-nadir viewing angle increases, the EFL for the conventional optical system in both C-S and A-S directions significantly decreases. This may correspond to negative (or barrel) distortion of about −17% or more.

On the other hand, the EFL for optical system 200 significantly increases in the C-S direction. The EFL in the A-S direction generally follows the trend of the C-S focal length and increases toward the FOV edge (although not as much). This may correspond to a positive (or pincushion) distortion of about +15% or more. Additionally, there is considerable less anamorphism with the A-S focal length average being about the same as the C-S focal length average. This permits optical system 200 to more closely track targets at both the center and at the edges of the field of view than the conventional optical system.

Figure 5A:
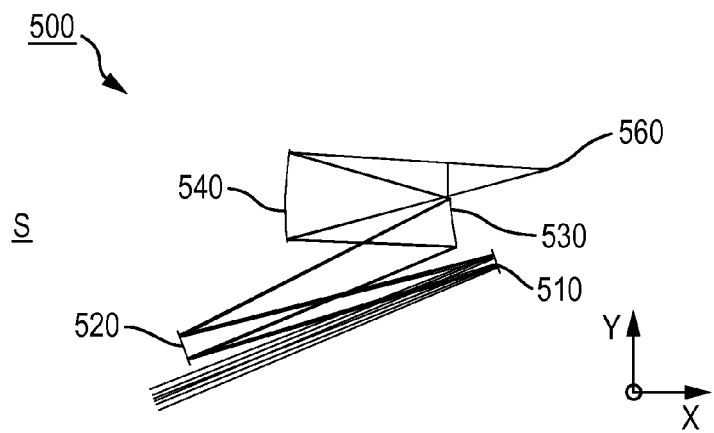
FIGS. 5(a) and (b) depict a ray-trace section of a WFOV optical system in accordance with an embodiment.
Figure 5B:
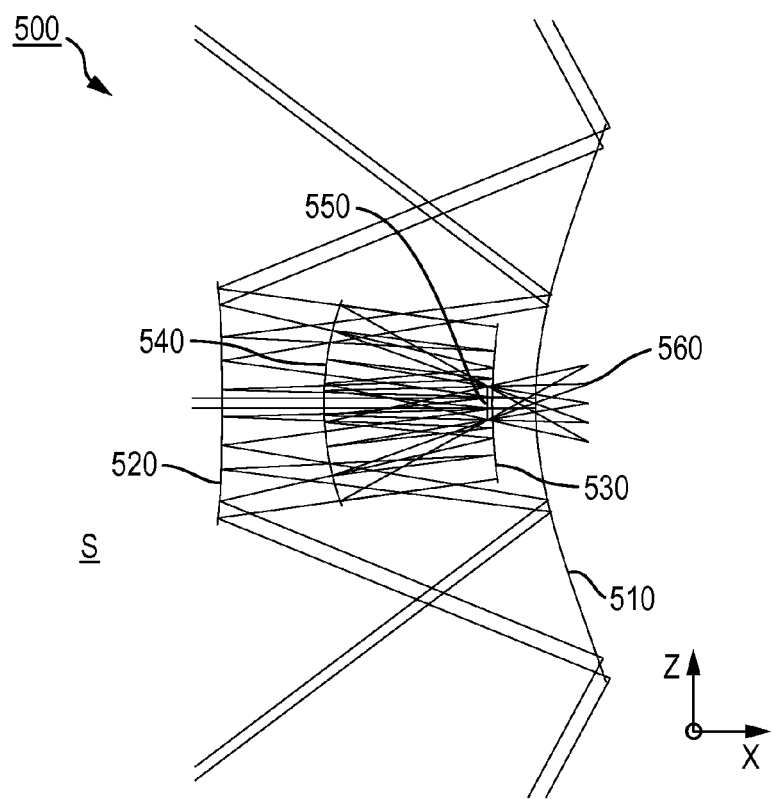

FIGS. 5(a) and (b) depict a ray-trace section of WFOV optical system 500 in accordance with an embodiment. FIG. 5(a) shows a side view and FIG. 5(b) shows a top view of optical system 500.

Optical system 500 may be configured as a unobscured WALRUS-type optical system, and may be, in some instances, characterized as having significant negative optical power in the front mirror or mirrors and significant positive optical power in the rear mirror or mirrors and having an external posterior aperture stop. As shown, optical system 500 may be configured to provide a 120 degree FOV.

Optical system 500 includes four optically powered mirrors. As depicted on the beam path beginning from image scene S, there is negative optical-power primary mirror 510, low optical-power secondary mirror 520, negative optical-power tertiary mirror 530, and positive optical-power quaternary mirror 540 closest (as measured along the beam path) to image plane 560. Light from scene S is incident on primary mirror 510, reflects from the primary mirror 510 to secondary mirror 520, reflects from secondary mirror 520 to tertiary mirror 530, reflects from tertiary mirror 530 to quaternary mirror 540, and reflects from quaternary mirror 540 through aperture stop 550 to image plane 560. As shown, aperture stop 550 may be located essentially midway between the quaternary mirror 540 and image plane 560.

Secondary mirror 520 is low optical-powered in that it has a much longer radius that than the other mirrors. For instance, the radius of secondary mirror 520 may be at least 10 times that of the radii of the other mirrors.

The location of image plane 560 may be used for positioning an imaging device. For example, a reflective double-pass spectrometer for hyperspectral imaging applications may be used, as described, for example, in U.S. Patent Application Publication No. 2008/0266687, mentioned above.

FIG. 6 shows one optical prescription 600 for one exemplary implementation of WFOV optical system 500 in accordance with an embodiment, and which is raytraced backward. The configuration enables optical system 500 to have a 120 degree FOV, and positive distortion of about +100% or more.

It should be understood and appreciated that it is typical for WFOV optical systems to be ray-traced backwards, therefore optical prescription 600 proceeds from the image plane 560 to scene S. Raytrace programs have a series of mathematical algorithms, called ray aiming routines, that allow the program to "find" the appropriate coordinates on and trace rays through the optics entrance pupil. These algorithms work very well when the optics entrance pupil is near the front of the optics and when the FOV is small. However, when the entrance pupil is in the very back of the optics and when the FOV is very large, the algorithms can fail and diverge (as opposed to converge) on the desired coordinates. This fact is well-known to experienced optical designers. While optical prescription 600 for the 120 degree FOV embodiment is raytraced backwards, optical prescription 300 for the 60 degree FOV embodiment can generally be traced either way.

In optical system 500, the entrance pupil (as well as the aperture stop) are located at the very back of the optics, when the optics are raytraced forwards (as the light ordinarily progresses). For FOVs that are at or below 60 degrees, most raytracing algorithms generally work well. Yet, for FOVs between 60 and 120 degrees (i.e., that is +/−30, and +/−60 degree half FOV), some raytracing algorithms can fail, and do not converge. Thus, optical prescription 600 was raytraced backward to overcome this problem. In the backwards direction, the entrance pupil is now at the front and the FOV is typically greatly increased by the pupil magnification.

Figure 7:
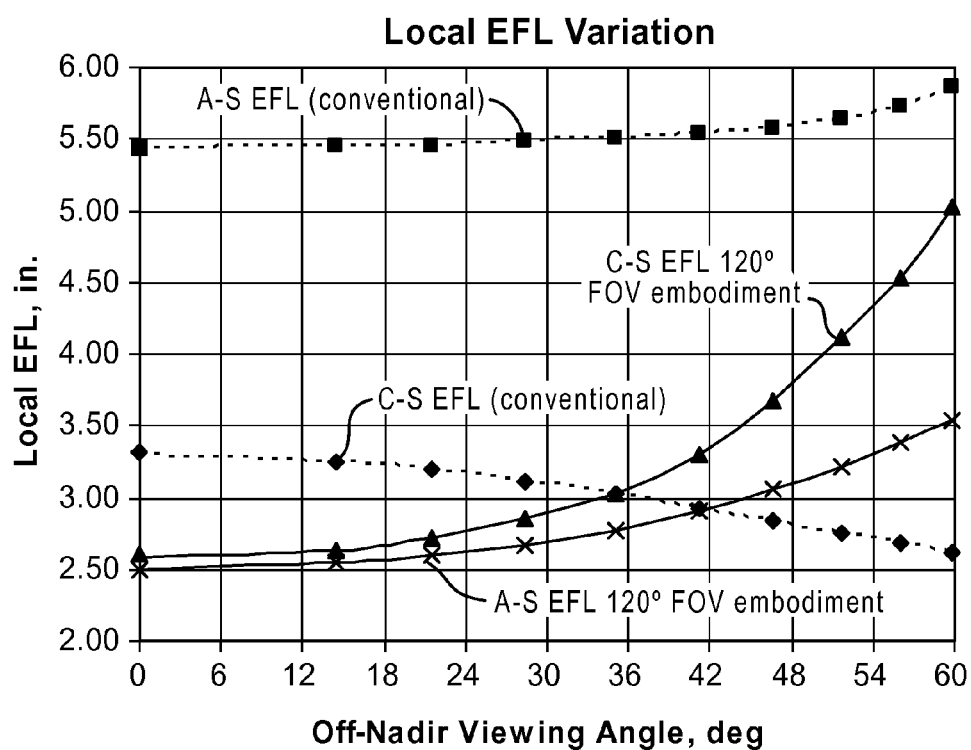
FIG. 7 is a plot of EFL vs. the off-nadir view angle for a conventional inverse-telephoto optical system and the WFOV optical system shown in FIG. 5.

FIG. 7 is a plot of EFL vs. the off-nadir view angle shows distortion in the C-S direction and A-S directions for a conventional inverse-telephoto optical system and WFOV optical system 500, respectively.

As the off-nadir viewing angle increases, the EFL for the conventional optical system slightly increases in the A-S direction and slightly decreases in the C-S direction. This may correspond to negative (barrel) distortion of about −21% or more. On the other hand, the EFL for optical system 500 significantly increases in both the A-S and the C-S directions. This may correspond to a positive (or pincushion) distortion of about +100% or more in the C-S direction with the A-S direction also being significantly improved. Additionally, there is considerable less anamorphism with the A-S focal length average being about the same as the C-S focal length average. This permits optical system 500 to more closely track targets at both the center and at the edges of the field of view.

FIG. 8 shows both optical system 200 and optical system 500 depicted in a common scale. While optical system 500 having a 120 degree FOV is slightly longer than optical system 200 having a 60 degree FOV, optical system 500 is essentially no wider than optical system 200. Thus, both optical systems 200 and 500 can maintain excellent image quality and a compact size.

Optical systems 200 and/or 500 may be disposed at least partially within a protective housing, and configured for imaging using an imaging detector. In one implementation, the imaging detector may be an infrared (IR) detector. For space-borne applications, an IR detector configured to operate at cryogenic temperatures of about 77K may be provided. Of course, other detectors or sensors might also be used, for instance, that are configured to detect electromagnetic radiation (light) in other spectra, such as visible and/or ultraviolet (UV), depending on various requirements.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A wide field of view (WFOV) optical system comprising:
   a negative optical-power primary mirror configured to receive and reflect light from an image scene;
   a low optical-power secondary mirror configured to receive and reflect light from the primary mirror;
   a negative optical-power tertiary mirror configured to receive and reflect light from the secondary mirror; and
   a positive optical-power quaternary mirror configured to receive and reflect light from the tertiary mirror, wherein the primary, secondary, tertiary and quaternary mirrors are configured to maintain an effective focal length (EFL) at edges of the field of view (FOV) of the optical system to be at least equal to that at the center of the FOV of the optical system so that a spatial resolution of the optical system essentially remains constant across the FOV.

2. The optical system according to claim 1, wherein an aperture stop is located between the quaternary mirror and the image plane.

3. The optical system according to claim 1, wherein the FOV of the optical system is configured to be approximately 60 degrees.

4. The optical system according to claim 1, wherein the FOV of the optical system is configured to be approximately 120 degrees.

5. The optical system according to claim 1, wherein the EFL at the edges of the FOV is greater than the EFL at the center of the FOV.

6. The optical system according to claim 3, wherein the mirrors provide positive distortion at one of the edges of the FOV of about +15% or more.

7. The optical system according to claim 4, wherein the mirrors provide positive distortion at one of the edges of the FOV of about +100% or more.

8. The optical system according to claim 1, wherein the EFL at the edges of the FOV is essentially the same as the EFL at the center of the FOV.

9. The optical system according to claim 1, further comprises an imaging device located at the image plane of the optical system.

10. The optical system according to claim 9, wherein the imaging device comprises a spectrometer.

11. The optical system according to claim 1, further comprising a housing for at least partially integrating and containing the mirrors.

12. A method for imaging the ground from an altitude comprising:
providing a wide field of view (WFOV) optical system including:
a negative optical-power primary mirror configured to receive and reflect light from an image scene and reflect;
a low optical-power secondary mirror configured to receive and reflect light from the primary mirror;
a negative optical-power tertiary mirror configured to receive and reflect light from the secondary mirror; and
a positive optical-power quaternary mirror configured to receive and reflect light from the tertiary mirror; and
configuring the primary, secondary, tertiary and quaternary mirrors so as to maintain an effective focal length (EFL) at edges of a field of view (FOV) of the optical system to be at least equal to that at the center of the FOV of the optical system so that a spatial resolution of the optical system essentially remains constant across the FOV.

13. The method according to claim 12, further comprising:
positioning an aperture stop between the quaternary mirror and the image plane.

14. The method according to claim 12, wherein the FOV of the optical system is configured to be approximately 60 degrees.

15. The method according to claim 12, wherein the FOV of the optical system is configured to be approximately 120 degrees.

16. The method according to claim 12, wherein the EFL at the edges of the FOV is greater than the EFL at the center of the FOV.

17. The method according to claim 14, wherein the mirrors provide positive distortion at one of the edges of the FOV of about +15% or more.

18. The method according to claim 15, wherein the mirrors provide positive distortion at one of the edges of the FOV of about +100% or more.

19. The method according to claim 12, wherein the EFL at the edges of the FOV is about the same as the EFL at the center of the FOV.

20. The method according to claim 12, further comprising:
positioning an imaging device at the image plane of the optical system.

21. The method according to claim 20, wherein the imaging device comprises a spectrometer.

22. The method according to claim 12, further comprising:
providing a housing for at least partially integrating and containing the mirrors.

* * * * *